Nov. 11, 1969 M. SHACHTER 3,477,247

DIFFERENTIAL GEAR CONSTANT VELOCITY JOINT

Filed June 3, 1968 3 Sheets-Sheet 1

MOSES SHACHTER
INVENTOR

BY John R. Faulkner
Clifford L. Sadler
ATTORNEYS

Nov. 11, 1969　　　M. SHACHTER　　　3,477,247
DIFFERENTIAL GEAR CONSTANT VELOCITY JOINT
Filed June 5, 1968　　　　　　　3 Sheets-Sheet 2

MOSES SHACHTER
INVENTOR

BY *John K. Faulkner*
*Clifford L. Sadler*
ATTORNEYS

Nov. 11, 1969  M. SHACHTER  3,477,247
DIFFERENTIAL GEAR CONSTANT VELOCITY JOINT
Filed June 3, 1968  3 Sheets-Sheet 3
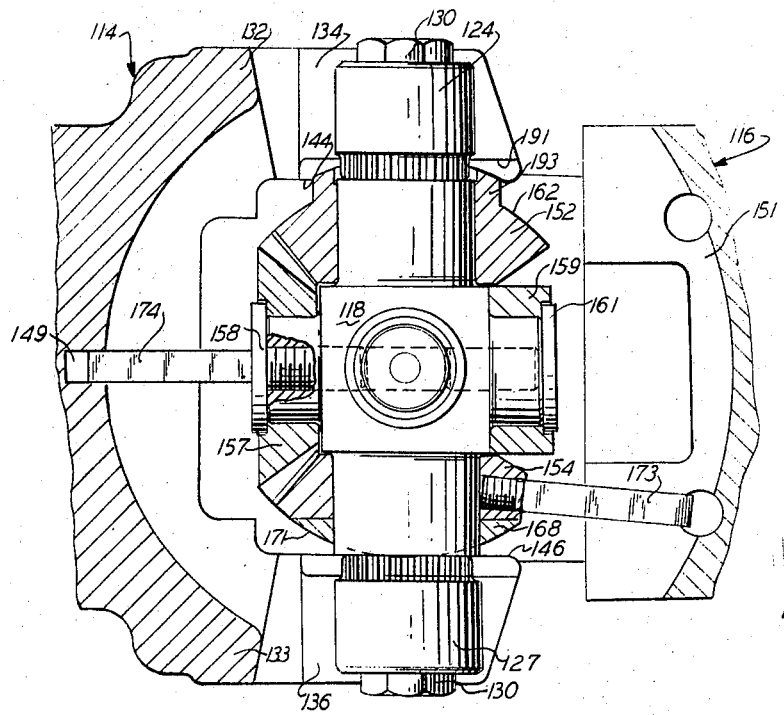
FIG.5
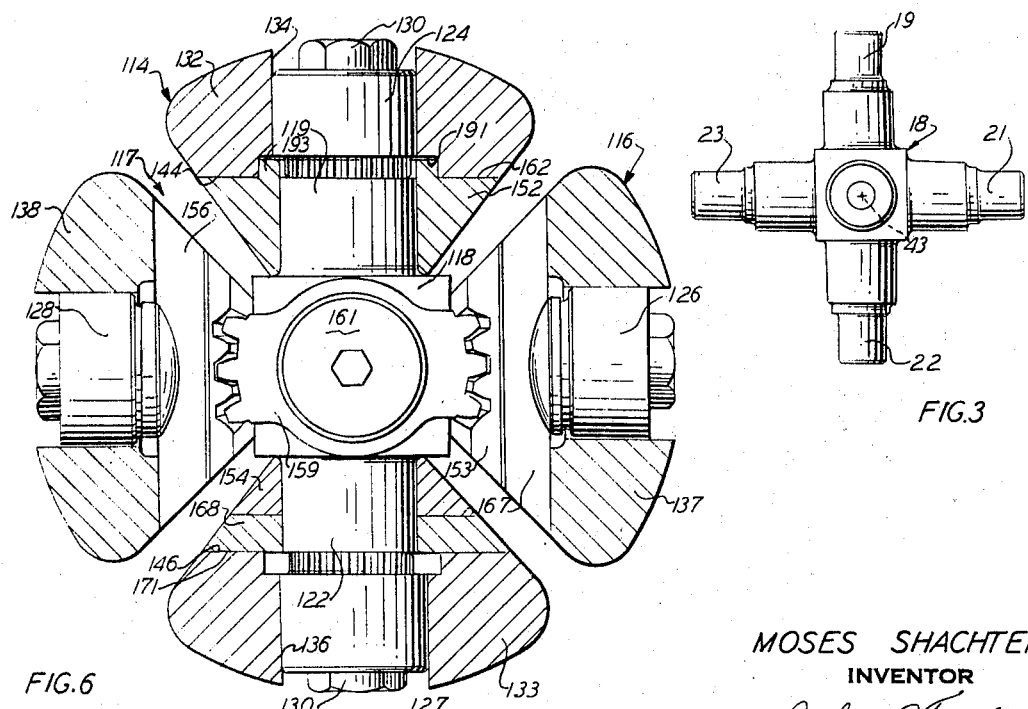
FIG.6
FIG.3
MOSES SHACHTER
INVENTOR
BY John R. Faulkner
Clifford L. Sadler
ATTORNEYS United States Patent Office 3,477,247
Patented Nov. 11, 1969

3,477,247
DIFFERENTIAL GEAR CONSTANT VELOCITY JOINT
Moses Shachter, Oak Park, Mich., assignor to Ford Motor Company, Dearborn, Mich., a corporation of Delaware
Filed June 3, 1968, Ser. No. 734,009
Int. Cl. F16d 3/30
U.S. Cl. 64—21     14 Claims

ABSTRACT OF THE DISCLOSURE

A constant velocity universal joint having a driving yoke, a driven yoke, and an intermediate cross member. The joint incorporates a double differential gear assembly which functions to position the cross member in a plane instantaneously bisecting the angles formed by the intersection of the axes of the yoke members.

Background of the invention

Universal joints are used in applications where it is not possible to transmit a torque through a rigid shaft. The universal joint permits the transmission of a torque from a driving shaft to a driven shaft when the two shafts are at an angle to each other. A common universal joint is the Cardan joint which consists of a combination of a driving yoke, a cross member and a driven yoke which connects the two rotating shafts. A characteristic of the Cardan joint is that when the input shaft angular velocity is constant, the output shaft angular velocity varies sinusoidally an amount proportional to the angle between the input and the output shaft. This velocity variation is often tolerable in applications requiring only small shaft angles; however, the variation may become objectionable in applications requiring relatively large shaft angles.

When the velocity variations of a simple Cardan joint are objectionable, a more sophisticated joint, commonly called a constant velocity joint or a uniform motion joint, may be used which substantially eliminates the velocity variations. However, common disadvantages of constant velocity joints as compared with the simple Cardan joint are the relatively high cost of manufacture and the increased bulk.

This invention provides a construction for a universal joint which has a high load capacity, is of a simple design, is quiet in operation and substantially eliminates variation between input and output velocities.

It also provides a constant velocity joint which is both axially, as well as radially, compact.

Furthermore, the invention provides a constant velocity joint which is economical to manufacture, which does not require a large number of highly precisioned parts, and in which various plastic materials may be effectively utilized.

Brief summary of the invention

A constant velocity joint constructed in accordance with this invention includes a first yoke, a second yoke and an intermediate cross member constructed to transmit a torque from one yoke to the other. The cross member includes a first pair of legs connected to the first yoke and a second pair of legs connected to the second yoke. A first gear means is interposed between the first pair of legs and the first yoke; similarly, a second gear means is interposed between the second pair of legs and the second yoke. A first connecting means is interposed between the first gear means and the second yoke; a second connecting means is interposed between the second gear means and the first yoke. The gear means and the connecting means are constructed to move the cross member through an angle one-half the magnitude of the angular displacement of one yoke with respect to the other yoke when one yoke is pivoted about an axis passing through one of the pairs of legs.

Brief description of the drawings

FIGURE 3 is an elevational view of the cross member 18.

FIGURE 5 is an elevational view with portions broken away of an alternate form of the invention.

FIGURE 6 is a section along line 6—6 of FIGURE 5.

Detailed description of a preferred embodiment

Figure 1:
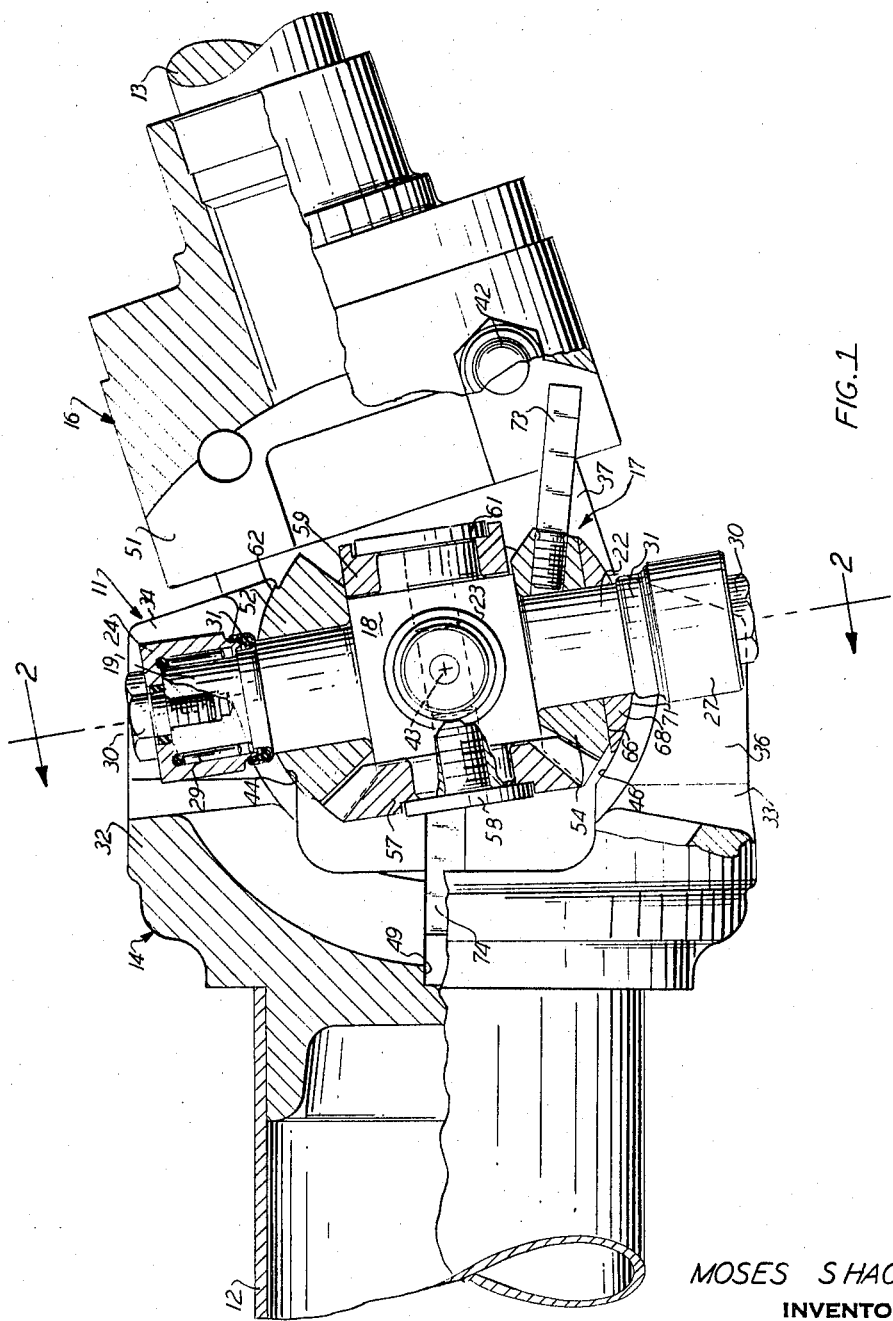
FIGURE 1 is an elevational view with portions broken away of a universal joint embodying the invention.
Figure 2:
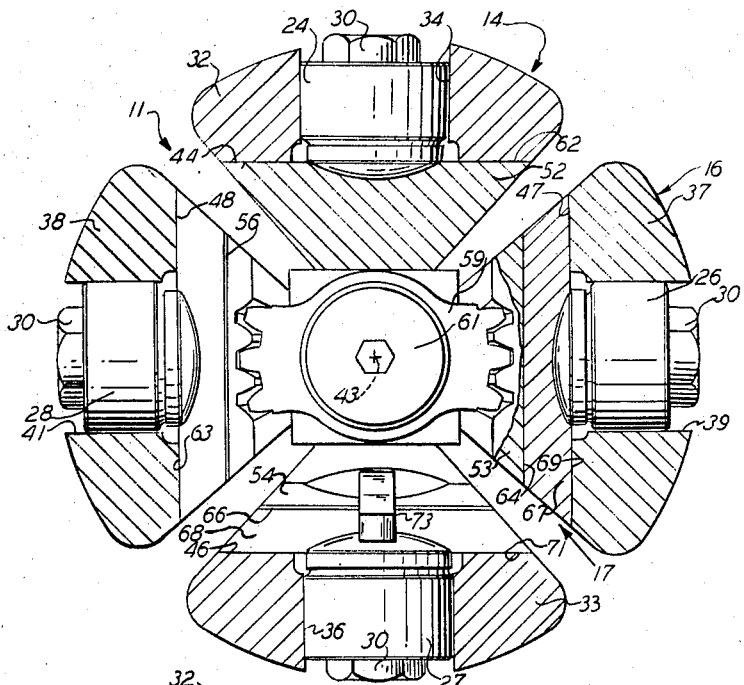
FIGURE 2 is a view taken along line 2—2 of FIGURE 1 illustrating certain parts in section and certain parts in elevation.
Figure 4:
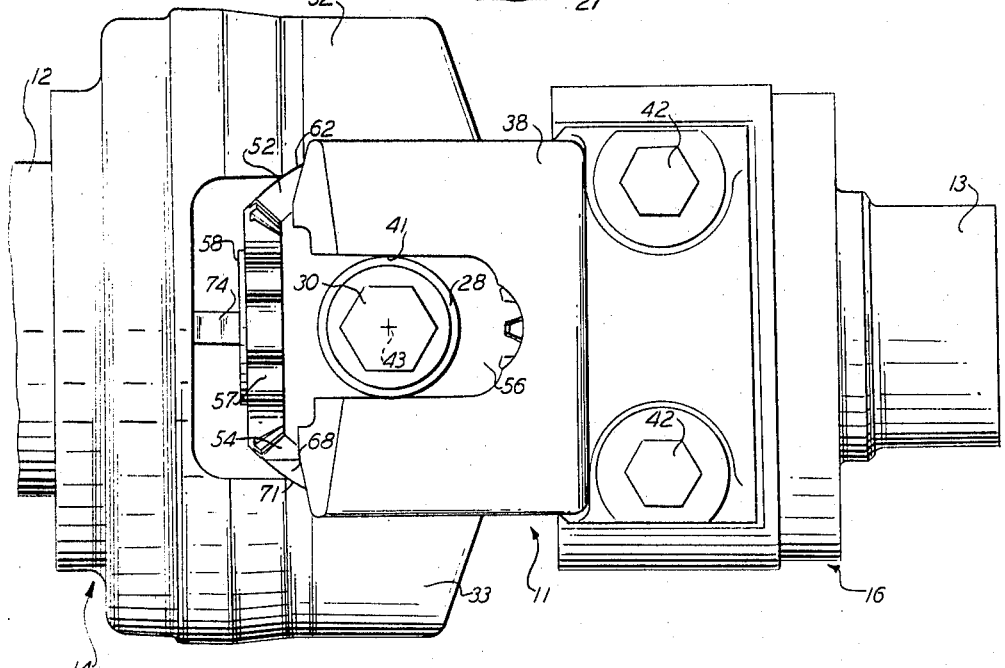
FIGURE 4 is an elevational view similar to FIGURE 1, with no portions removed, and in which the axes of rotation of the yokes are aligned.

A constant velocity universal joint assembly is referred to generally in the drawings by numeral 11. The assembly 11 links two shafts 12 and 13 and comprises essentially two yokes 14 and 16 and an intermediate cross assembly 17.

The cross assembly 17 includes a cross member 18 having four identical, coplanar legs 19, 21, 22, 23 intersecting at right angles. One of four identical rollers 24, 26, 27 and 28 is rotatably secured to each of the outer portions of the cross member legs. Needle bearings 29 may be used to reduce friction between the legs and the rollers. Cap screws 30 are threadedly received in the ends of legs 19, 21, 22 and 23 to retain the rollers about the end portions of the legs. Dirt shields 31 are positioned about each of the rollers 24, 26, 27 and 28 adjacent their inner openings.

Yoke 14 has two arm portions 32 and 33 which extend toward the cross assembly 17. The arm portions have two axially extending slots 34 and 36 slidingly receiving axially opposed rollers 24 and 27, respectively. Similarly, yoke 16 has two arm portions 37 and 38 having two axially extending slots 39 and 41 slidingly receiving the other axially opposed rollers 26 and 28, respectively. A torque is transmitted from yoke 14 to yoke 16 via the rollers 24 and 27 received in slots 34 and 36, through the cross member 18 and, finally, through the rollers 26 and 28 received in slots 39 and 41 of yoke 16.

Each of yokes 14 and 16 has identical functional geometry; however, yoke 14 differs strucutrally from yoke 16, as illustrated in the drawings, in that yoke 16 has several elemental parts held together as a unit by cap screws 42, while yoke 14 is a one-piece construction. The multielement construction is designed to ease final assembly of the joint 11. When assembled, yoke 14 is 90° axially out of phase with yoke 16.

A reference point 43 is defined as the intersection of the axis of rotation of shaft 12 and yoke 14 with the axis of rotation of shaft 13 and yoke 16. Radially inwardly facing surfaces 44 and 46 of the yoke arms 32 and 33, respectively, are cylindrical arcs having a common central axis perpendicular to the axis of rotation of shaft 12 and passing through reference point 43. Similarly, the radially inwardly facing surfaces 47 and 48 of the yoke arms 37 and 38 are cylindrical arcs having a common central axis perpendicular to the axis of rotation of shaft 13 and passing through reference point 43. A channel 49 is formed within yoke 14, located midway between the yoke arms 32 and 33 extending axially towards shaft 12. A similar channel 51 is formed within yoke 16, located midway between arms 37 and 48 and extending axially towards shaft 13.

Bevel gears 52, 53, 54 and 56 rotatably engage the intermediate portions of cross member legs 19, 21, 22, and 23, respectively. The gear teeth have a 45 degree bevel and fill only a portion of the gear periphery. Gears 52 and 54 are coaxial and interconnected by a planet gear 57 which is rotatably mounted to cross member element 18 by threaded member 58. Gears 53 and 56 are also coaxial and interconnected by a second planet gear 59 which is rotatably mounted to cross element member 18 by threaded member 61. Planet gears 57 and 59 are coaxial about an axis perpendicular to both the common axis of gears 52 and 54 and the common axis of gears 53 and 56.

Bevel gears 52 and 56 have outwardly facing cylindrical arc surfaces 62 and 63 which engage yoke arm surfaces 44 and 48, respectively. Bevel gears 53 and 54 have outwardly facing plane surfaces 64 and 66 which engage washers 67 and 68, respectively. Washers 67 and 68 have outwardly facing cylindrical arc surfaces 69 and 71 which correspond to and engage yoke arm surfaces 47 and 46, respectively. These mating cylindrical arc surfaces permit angular movement of gear 52 and washer 68 relative to yoke 14 about the common axis of cylindrical arc surfaces 44 and 46. Similarly, angular movement of gear 56 and washer 67 relative to yoke 16 is permitted about the common axis of cylindrical arc surfaces 47 and 48.

Connecting rods 73 and 74 project from gears 53 and 54 and extend into channels 51 and 49, respectively. The width of channels 49 and 51 is approximately equal to the individual width of one of the connecting rods so that relative angular movements between a yoke and a rod is permitted in the direction of the length of the channel, but is precluded in other directions.

Operation

It is an established principle in the design of constant velocity joints that a necessary condition for transmittal of theoretically perfect constant angular velocity is that the plane of driving engagement between the two yokes must bisect the instantaneous angle between the two shafts. In a universal joint of the type having a pair of yokes separated by a cross member, this condition is closely approximated if the plane of the cross member bisects the obtuse angle between the shafts. It is therefore an object of this invention to provide a joint in which the plane of the cross member 18 at all times bisects the angle formed by the intersection of the axes of shafts 12 and 13. Assuming that the shafts 12 and 13 and their adjoining yokes 14 and 16 are initially axially aligned and that the legs of the cross member 18 extend either vertically or horizontally, the response of the cross assembly will be considered as yoke 14 is angularly displaced upwardly from an aligned position, in the plane of the paper, to a position as illustrated by FIGURE 1. For purposes of explanation, the assembly is considered in a nonrotating condition.

As yoke 16 is displaced upwardly, connecting rod 73 slides freely within channel 51. Consequently, gear 54 does not rotate about leg 22. Gear 56, however, is caused to move with yoke 16 about the axis of leg 23. Gear 53 is prevented from movement about the axis of leg 21 by the connecting rod 74 extending from gear 53 into channel 49 of yoke 14. With gear 53 maintaining its original position relative to yoke 14 and gear 56 displaced angularly an amount equal to the displacement of yoke 16, the planet gear 59 which interconnects bevel gears 53 and 56 causes cross member 18 to be angularly displaced about the axis of legs 21 and 23 exactly half that of yoke 16. The function is similar when yoke 16 is angularly displaced in a plane perpendicular to the plane of the paper of FIGURE 1. Thus the cross member 18 at all times bisects the instantaneous angle between the axes of rotation of yokes 14 and 16 and a constant angular velocity is transmitted through assembly 11 from shaft 12 to shaft 13.

An alternate embodiment of the invention

An alternate embodiment of the invention is illustrated by FIGURES 5 and 6. The alternate embodiment comprises a slip joint in which yoke 114 is free to move axially relative to cross assembly 117 and yoke 116. The previously described embodiment, illustrated by FIGURES 1–4, is a fixed joint in which displacement other than angular displacement between the yokes 14 and 16 is precluded.

Most parts of the two embodiments are identical; only the structural differences will be described on the following paragraphs. The corresponding elements of the two embodiments are correspondingly numbered; e.g., yoke 14 of the first embodiment is analogous to yoke 114 of the second embodiment.

Yoke 114 of the alternate embodiment has plane surfaces 144 and 146, rather than the cylindrical arc surfaces 44 and 46 of yoke 14. A parallel edged groove 191 is formed within the plane surface 144. The base of groove 191 is also a plane surface.

Gear 152 is similar to gear 52 except that it has a protruding cylindrically arced back portion 193 which is slidingly received within groove 191. The sides of the back portion 193 are parallel and slidingly engage the corresponding parallel edges of groove 191.

Angular movement of yoke 116 relative to gear 152 is permitted only in the direction of groove 191 about the common axis of cylindrical arc surfaces 162 and 171. Because the yoke surfaces 114 and 146 are plane, linear displacement between yokes 114 and 116 along the axis of rotation of yoke 114 is also permitted.

Except as noted above, the elements of the alternate embodiment are identical with those of the first embodiment.

The foregoing descriptions present presently preferred embodiments of the invention. Modifications and alternations will occur to those skilled in the art that are included within the scope and spirit of the following claims.

Claimed is:
1. A constant velocity universal joint comprising:
a first yoke and a second yoke,
a cross member intermediate said yokes constructed to transmit a torque from one yoke to the other,
said cross member including a first pair of legs connected to said first yoke and a second pair of legs connected to said second yoke,
first gear means interposed between said first legs and said first yoke,
second gear means interposed between said second pair of legs and said second yoke,
first connecting means interposed between said first gear means and said second yoke,
second connecting means interposed between said second gear means and said first yoke,
said means being constructed to move said cross member through an angle one-half the magnitude of the angular displacement of one yoke with respect to the other yoke when said one yoke is pivoted about an axis passing through one of said pairs of legs.
2. A constant velocity universal joint comprising:
a first yoke and a second yoke,
a cross assembly intermediate said yokes constructed to transmit torque from one yoke to the other,
said cross assembly having elements including a cross member having four legs, a first pair of said legs being coaxial, a second pair of said legs being coaxial, said first pair of legs being perpendicular to and coplanar with said second pair of legs,
first and second gear means rotatably mounted about a coaxial pair of said legs,
means rotatably mounted to said cross assembly interconnecting said first and second gear means,
first connecting means between the first of said gears and said first yoke and slidably engaging said first yoke, second connecting means between the second of said gears and said second yoke and slidably engaging said second yoke, said means being constructed to move said cross member an angle one-half the magnitude of the angular displacement of one yoke relative to the other yoke when said one yoke is pivoted about an axis passing through one of said pairs of legs.

3. A constant velocity universal joint according to claim 2 and including:

said first yoke engaging one coaxial pair of said legs,
said second yoke engaging the other coaxial pair of said legs.

4. A constant velocity joint according to claim 3 and including:

one of said connecting means comprising a pair of inwardly facing cylindrical arc surfaces of a common radius on one of said yoke members,
a corresponding pair of outwardly facing cylindrical arc surfaces of a common radius approximately equal to said first mentioned radius on elements of said cross assembly.

5. A constant velocity universal joint comprising:

a first yoke and a second yoke,
a cross assembly intermediate said yokes constructed to transmit a torque from one yoke to the other,
said cross assembly having elements including:
a cross member having four legs intersecting at right angles,
gear means rotatably mounted about each of said legs,
means pivotally mounted to said cross assembly interconnecting a first pair and a second pair, respectively, of said gear means,
said cross assembly having sliding contacts with said first and second yokes and constructed to position said cross member element in a plane which bisects the instantaneous angle formed by the axes of rotation of said first and second yokes.

6. A constant velocity universal joint according to claim 5 and including:

said yokes each having two arm portions, an axially disposed slot formed in each arm portion,
said cross assembly including rollers rotatably mounted about each of the end portions of said legs, each of said rollers slidably received within each of said slots.

7. A constant velocity universal joint according to claim 5 wherein:

a first axis is defined as the axis of rotation of said first yoke, a second axis is defined as perpendicular to said first axis, a third axis is defined as perpendicular to said first and second axes, a fourth axis is defined as the axis of rotation of said second yoke, a fifth axis is defined as perpendicular to said fourth axis, a sixth axis is defined as perpendicular to said fourth and fifth axes,
said first and fourth axes being coplanar and intersecting,
said second, third, fifth and sixth axes each passing through the point of intersection of said first and fourth axes,
said second and third axes rotating with said first yoke member about said first axis,
said fifth and sixth axes rotating with said second yoke about said fourth axis,
said second and fifth axes and said third and sixth axes being coplanar when said first and fourth axes are colinear,
first connecting means between a first of said gear means and said first yoke constructed to rotate said first gear means an amount equal to the magnitude of the angular displacement of said first axis about said third axis relative to said fourth axis,
second connecting means between a second of said gear means and said second yoke constructed to rotate said second gear means an amount equal to the magnitude of the angular displacement of said fourth axis about said fifth axis relative to a said first axis;
third connecting means between a third of said gear means and said second yoke constructed to rotate said third gear means an amount equal to the magnitude of the angular displacement of said fourth axis about said sixth axis relative to said first axis,
fourth connecting means between a fourth of said gear means and said first yoke constructed to rotate said fourth gear means an amount equal to the magnitude of the angular displacement of said first axis about said second axis relative to said fourth axis.

8. A constant velocity universal joint according to claim 5 and including:

first connecting means between a first of said gear means and said first yoke and slidably engaging said first yoke,
second connecting means between a second of said gear means and said second yoke and slidably engaging said second yoke,
third connecting means between a third of said gear means and said second yoke and slidably engaging said second yoke,
fourth connecting means between a fourth of said gear means and said first yoke and slidably engaging said first yoke.

9. A constant velocity universal joint according to claim 8 and including:

said yokes each having two arm portions, an axially disposed slot formed in each arm portion,
said cross assembly including rollers rotatably mounted about each of the end portions of said legs, each of said rollers slidably received within each of said slots.

10. A constant velocity joint according to claim 8 and including:

one of said connecting means comprising a pair of inwardly facing cylindrical arc surfaces of a common radius on one of said yoke members,
a corresponding pair of outwardly facing cylindrical arc surfaces of a common radius approximately equal to said first mentioned radius on elements of said cross assembly.

11. A constant velocity joint according to claim 8 and including:

one of said connecting means comprising a channel extending axially into one of said yokes, and
connecting rod means secured to and extending from one of said gears into said channel, said connecting rod means having a width approximately equal to the width of said channel.

12. A constant velocity joint according to claim 8 and including:

one of said connecting means comprising a pair of inwardly facing parallel plane surfaces on one of said yokes having a groove formed in each of said surfaces,
a pair of outwardly facing cylindrical arc surfaces of a common radius on elements of said cross assembly, a radially outwardly extending pair of back portions projecting from said arc surfaces, said back portions also having cylindrical arc surfaces of a second common radius, the width of said back portions being approximately equal to the width of said grooves,
said first mentioned arc surfaces engaging the parallel plane surfaces of said yoke, said arc surfaces of said back portion engaging the bottoms of said grooves.

13. A constant velocity joint according to claim 8 and including:

one of said connecting means comprising a pair of inwardly facing cylindrical arc surfaces of a common radius on one of said yoke members, a corresponding pair of outwardly facing cylindrical arc surfaces of a common radius approximately equal to said first mentioned radius on elements of said cross assembly, another of said connecting means comprising a channel extending axially into at least one of said yokes, and connecting rod means secured to and extending from one of said gear means into said channel, said connecting rod means having individual width approximately equal to the width of said channel.

14. A constant velocity joint according to claim 8 and including:

one of said connecting means comprising a channel extending axially into at least one of said yokes, and connecting rod means secured to and extending from one of said gear means into said channel, said connecting rod means having individual width approximately equal to the width of said channel, another of said connecting means comprising a pair of inwardly facing parallel plane surfaces on one of said yokes having a groove formed in each of said surfaces, a pair of outwardly facing cylindrical arc surfaces on said first pair of nuts having a common radius, a radially outwardly extending pair of back portions also having cylindrical arc surfaces of a common radius, the width of said back portions being approximately equal to the width of said grooves, said first mentioned arc surfaces engaging the parallel plane surfaces of said yoke, said arc surfaces of said back portion engaging the bottom of said grooves.

References Cited

UNITED STATES PATENTS

| | | | |
|---|---|---|---|
| 1,626,270 | 4/1927 | Craun | 64—21 X |
| 2,709,902 | 6/1955 | Wildhaber | 64—21 |
| 2,777,306 | 1/1957 | Wildhaber | 64—21 |
| 3,036,446 | 5/1962 | Morgenstern | 64—21 X |

HALL C. COE, Primary Examiner

UNITED STATES PATENT OFFICE
CERTIFICATE OF CORRECTION

Patent No. 3,477,247 November 11, 1969

Moses Shachter

It is certified that error appears in the above identified patent and that said Letters Patent are hereby corrected as shown below:

Column 8, line 2, after "surfaces," insert -- and --; line 3, cancel "on"; line 4, cancel "said first pair of nuts"; same line 4, after "radius" insert -- on elements of said cross assembly --.

Signed and sealed this 10th day of November 1970.

(SEAL)
Attest:

Edward M. Fletcher, Jr.
Attesting Officer

WILLIAM E. SCHUYLER, JR.
Commissioner of Patents